United States Patent Office 2,983,043
Patented May 9, 1961

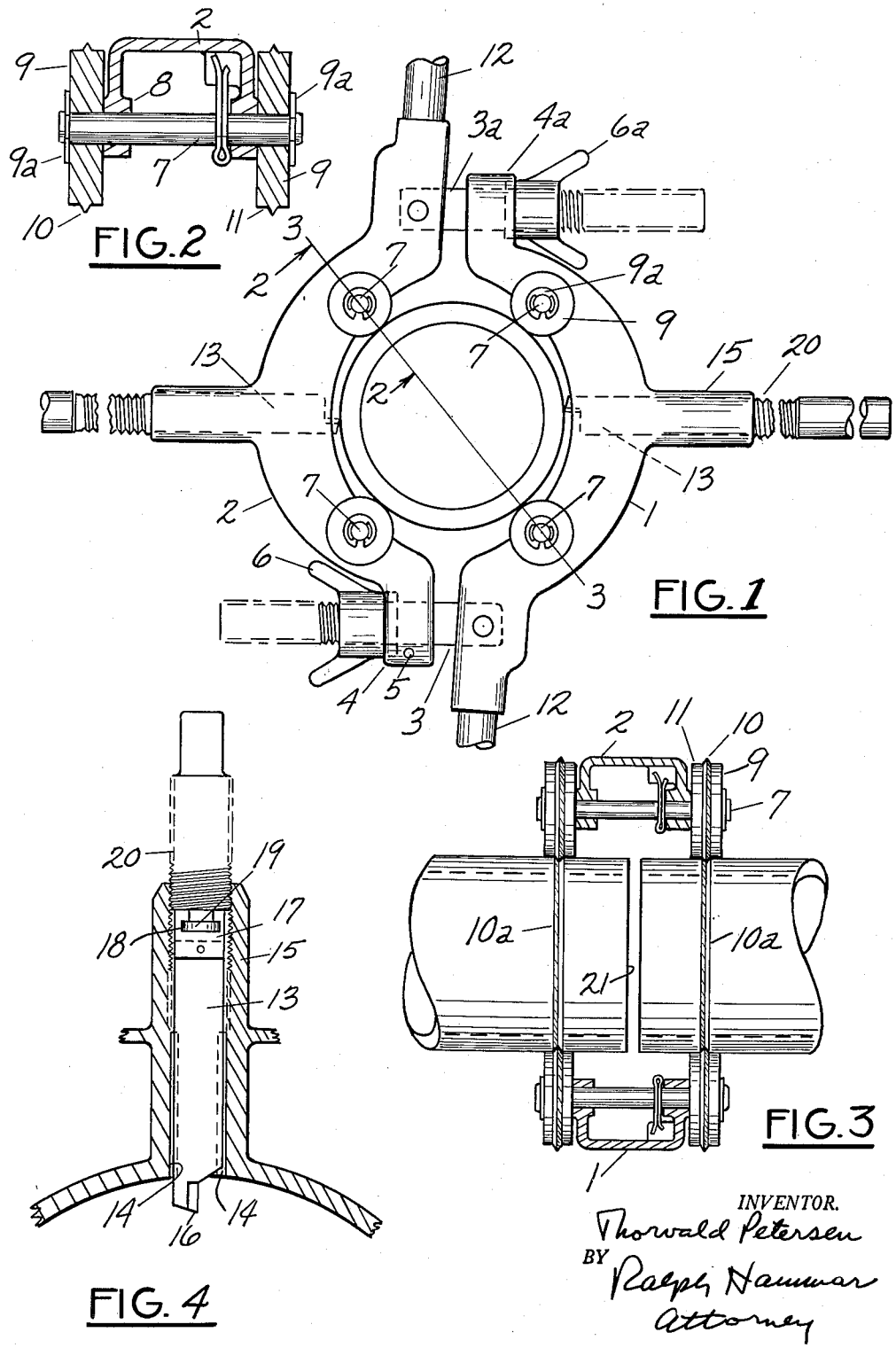

2,983,043

PIPE CUTTER

Thorvald Petersen, Erie, Pa., assignor to Reed Manufacturing Company, Erie, Pa., a corporation of Pennsylvania Filed May 9, 1960, Ser. No. 27,568

3 Claims. (Cl. 30—95)

This invention is a pipe cutter of the type having a cutting blade which cuts a slot through the wall of the pipe and is particularly concerned with a construction for maintaining alignment until the cut is completed. The cutter is particularly useful for asbestos cement and ductile iron pipe.

In the drawing, Fig. 1 is an end elevation of the cutter, Fig. 2 is a section on line 2—2 of Fig. 1, Fig. 3 is a section of line 3—3 of Fig. 1, and Fig. 4 is a section through a holder for one of the cutting blades.

The invention is shown applied to a pipe cutter having symmetrical C-shaped frame sections 1 and 2. At one end of the frame section 1 is pivoted a link 3 received in the slotted end 4 of the frame section 2 and kept therein by a removable pin 5. At the opposite end of the frame section 2 is pivoted a link 3a received in the slotted end 4a of the frame section 1. The links are threaded to receive wing nuts 6 and 6a by which the frame sections may be tightened toward each other. Upon loosening of the nuts, the link 3a may be moved out of the slot 4a and thereafter the frame sections may be opened to permit removal from a pipe and installation on another pipe.

The frame sections 1 and 2 are of channel section as shown in Fig. 2 and four symmetrically disposed axles 7 are non-rotatably anchored in the flanges 8 of the channel sections and extend parallel to the axis of the pipe. Two of the axles are arranged in the frame section 1 and the other two in the frame section 2. A pair of guide wheels 9 are journaled on the projecting ends of each axle and held thereon by retaining rings 9a. The wheels of each pair are axially spaced apart the same distance and each wheel has a circumferentially projecting rib 10 projecting radially beyond a wide tread section 11. When the cutter is first installed on the pipe and before the nuts 6 and 6a are tightened, the uppermost ribs 10 make contact with the upper surface of the pipe and the cutter is very easily centered on the pipe so that the ribs 10 at each end of the axles lie in the same plane. No particular skill is required for alignment of the pipe cutter square with the pipe. The cutter naturally seats on the pipe in proper alignment due to the angular spacing of the axles and axial spacing of the wheels. After the pipe cutter is mounted, the nuts 6 and 6a are tightened, forcing the narrow ribs 10 into the pipe until further penetration is stopped by contact of the tread sections 11 with the pipe. The cutter is then rotated one full revolution about the pipe by means of handles 12 on the frame sections and at the end of this revolution, the ribs 10 have generated centering grooves 10a in the pipe. Thereafter, the wide treads 11 of the wheels rid on the outer surface of the pipe without substantial penetration. The links 3, 3a enable the cutter to follow pipe which is out of round. The first revolution of the pipe cutter is solely to provide the centering grooves 10a in the pipe which cooperate with the ribs 10 to hold the pipe cutter in alignment during the subsequent pipe cutting operation. Alignment of the pipe cutter is important at all stages. The pairs of axially spaced wheels not only permit easier initial alignment of the cutter, but maintain the alignment throughout the cutting operation, even after the pipe is completely severed. The wheels also reduce the frictional resistance.

The cutting of the pipe is effected by flat cutting blades 13 guided in the plane of the desired cut by key ways 14 in bosses 15 at the center of each of the frame sections 1 and 2. The blades 13 are located in a plane midway between the planes of the wheels 9. The inner ends of the blades have cutting points 16 ground to the shape required for the material of the pipe being cut. The opposite end of each blade is fixed to a head 17 having a transverse T-slot 18 therein rotatably receiving the circular head 19 at the end of a pressure screw 20. Turning of the pressure screw 20 advances or retracts the cutting blade depending upon the direction of rotation. The circular head 19 on the pressure screw turns freely in the T-slot 18.

In the use of the cutter, after the cutter has been aligned on the pipe and has been turned through its first revolution to establish the centering grooves 10a for the ribs 10 of the wheels 9, the cutting blades 13 are alternately advanced into the pipe. This advancing may be done while rotating. Usually, each cutting blade is advanced once during each revolution and the amount of the advance determines the depth of cut. The blade may be advanced while the cutter is rotating.

As is apparent from Fig. 3, the cutting blades cut a narrow slot 21 in the wall of the pipe, actually removing material as the slot is cut. The cutting action continues until the pipe is completely severed and the wheels 9 maintain the pipe in alignment at all times, even after the slot 21 extends completely through the wall of the pipe.

What is claimed as new is:

1. A cutter for pipe comprising a plurality of axles parallel to and angularly spaced about the axis of the pipe, a pair of axially spaced wheels on each axle, each wheel having a tread and a circumferential rib on the tread, the ribs of the wheels being in axially spaced planes perpendicular to the axis of the pipe, a frame encircling the pipe, said frame comprising rigid sections, each section supporting two axles between its ends, means for clamping the frame sections against the pipe, the ribs being narrow enough to penetrate the pipe and to form axially spaced guide grooves in the pipe in said planes, the treads being wide enough to ride on the pipe without substantial penetration, a cutting tool in one of said sections between the axles supported therein, said tool being in a plane between said wheels and perpendicular to the axis of the pipe, and means for advancing the tool into the pipe.

2. A cutter for pipe comprising a plurality of axles parallel to and angularly spaced about the axis of the pipe, a pair of axially spaced wheels on each axle, each wheel having a tread and a circumferential rib on the tread, the ribs of the wheels being in axially spaced planes perpendicular to the axis of the pipe, a frame comprising two C-shaped sections in end to end relation about the pipe, each section having means for supporting two axles, means for urging the frame sections toward each other to force the wheels against the pipe, the ribs being narrow enough to penetrate the pipe and to form axially spaced guide grooves in the pipe in said planes, the treads being wide enough to ride on the pipe without substantial penetration, a cutting tool in each frame section between adjacent axles in the section and in a plane between said wheels and perpendicular to the axis of the pipe, and means for advancing the tools into the pipe.

3. A cutter for pipe comprising a plurality of axles parallel to and angularly spaced about the axis of the pipe, a pair of axially spaced wheels on each axle, each wheel having a tread and a circumferential rib on the tread, the ribs of the wheels being in axially spaced planes perpendicular to the axis of the pipe, a frame supporting the axles and including means for urging the axles toward the outer surface of the pipe, the ribs being narrow enough to penetrate the pipe and to form axially spaced guide grooves in the pipe in said planes, the treads being wide enough to ride on the pipe without substantial penetration, a cutting tool between adjacent axles and in a plane between said wheels and perpendicular to the axis of the pipe, and means for advancing the tool into the pipe.

No references cited.